(12) United States Patent
Smiley et al.

(10) Patent No.: US 9,100,277 B2
(45) Date of Patent: Aug. 4, 2015

(54) CLIENT CREDENTIALS DATA STRUCTURE AND METHOD OF EMPLOYING THE SAME

(71) Applicant: Alcatel-Lucent USA Inc., Murray Hill, NJ (US)

(72) Inventors: Colin Smiley, Austin, TX (US); Gordon McKinney, Austin, TX (US); Robert Farnum, Austin, TX (US); Frank Quatro, Austin, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 14 days.

(21) Appl. No.: 13/722,837

(22) Filed: Dec. 20, 2012

(65) Prior Publication Data

US 2014/0068745 A1 Mar. 6, 2014

Related U.S. Application Data

(60) Provisional application No. 61/693,996, filed on Aug. 28, 2012.

(51) Int. Cl.
*H04L 29/00* (2006.01)
*H04L 12/24* (2006.01)
*G06F 21/44* (2013.01)
*H04L 29/12* (2006.01)

(52) U.S. Cl.
CPC .............. *H04L 41/00* (2013.01); *G06F 21/44* (2013.01); *H04L 41/0816* (2013.01); *H04L 61/2553* (2013.01); *H04L 61/2514* (2013.01)

(58) Field of Classification Search
CPC combination set(s) only.
See application file for complete search history.

(56) References Cited

U.S. PATENT DOCUMENTS

2010/0250919 A1* 9/2010 Newcombe .................. 713/150
2010/0325708 A1* 12/2010 Lundblade et al. ............... 726/6

\* cited by examiner

*Primary Examiner* — Ghazal Shehni
(74) *Attorney, Agent, or Firm* — Hitt Gaines, P.C.

(57) ABSTRACT

A client credentials data structure, a method of employing the same and a secure client-server communication system employing the data structure or the method. One embodiment of the data structure is associated with a client and includes: (1) a pre-provisioned set of credentials configured to register the client with a server, (2) a standard user set of credentials employable for secure client-server communication, and (3) a re-acquisition token combinable with the pre-provisioned set of credentials to allow the client to re-register the client with the server.

18 Claims, 1 Drawing Sheet

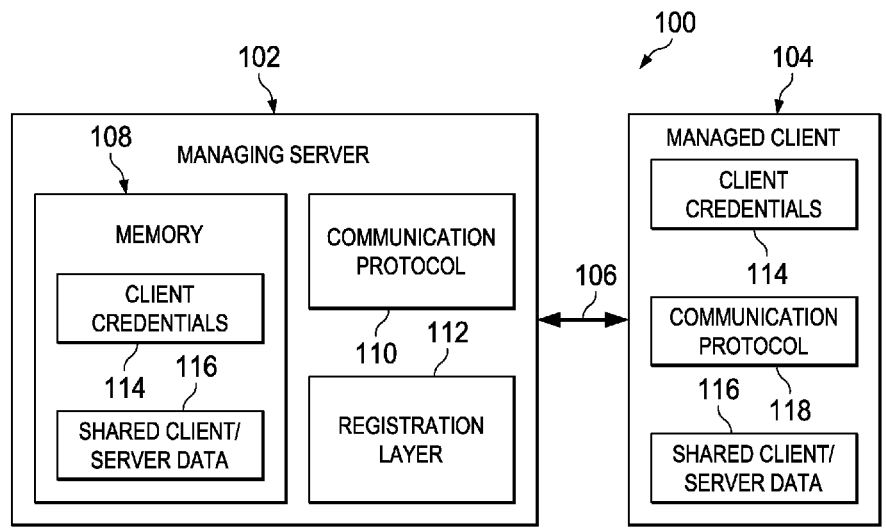
FIG. 1
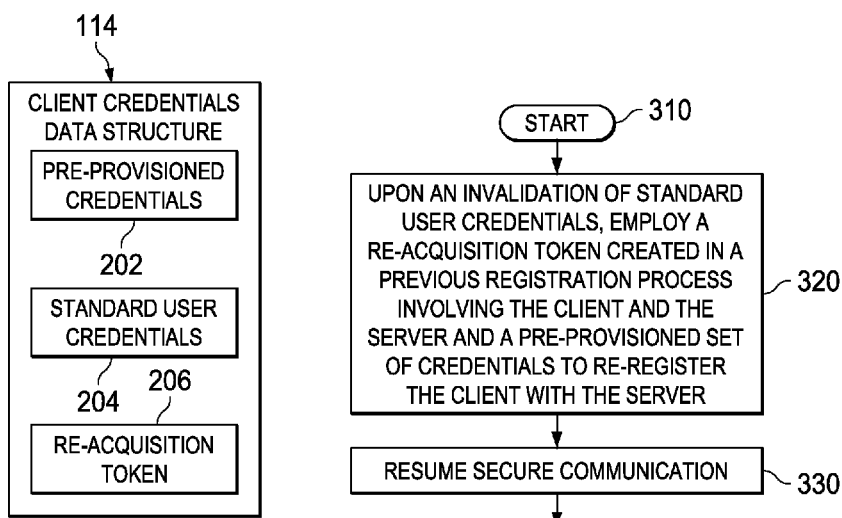

CLIENT CREDENTIALS DATA STRUCTURE AND METHOD OF EMPLOYING THE SAME

CROSS-REFERENCE TO RELATED APPLICATION

This application claims priority based on U.S. Provisional Application Ser. No. 61/693,996, filed by Smiley, et al., on Aug. 28, 2012, entitled "Communication with Managed Devices," commonly assigned with this application and incorporated herein by reference.

TECHNICAL FIELD

This application is directed, in general, to secure client-server communications and, more specifically, to a managed client establishing its identity with a managed server.

BACKGROUND

Computing architectures often use a client-server model. The client-server model has centralized machines providing resources or services called servers. Resources or services are provided to distributed devices called clients. A typical mode of operation for a client-server relationship is for a client to request a service from the server, the server then executes an application or carries out some task involving data or functions available to the server, and finally the server completes the loop by providing some level of feedback or results to the client. This activity is generally carried out over a network, but a client-server model may be employed on a single machine (e.g., a personal computer acting as server and client).

The client-server model offers several benefits over alternative architectures like peer-to-peer. In the peer-to-peer model, the architecture includes only client devices. Resources of each client are shared for the benefit of an entire network. Conversely, in the client-server architecture, client resources are not utilized via the server, and therefore are only available to the client. The server, being centralized, acts as a hub of activity and sits in a position to control resources, services, or access to either. Client-server architectures are easier to maintain and can be more reliable because very little relies on the individual clients.

Many common systems have adopted the client-server model. A simple example is a basic website. The application that is the website resides on a server on a network. Clients may gain access to that website through a client interface or web browser in most cases. Client activity is translated to service requests from the client to the server. The server replies by executing the website application. Another common example is an email system. Each email account is a client and operates via requests to the email server. Many other examples exist such as: web servers, file transfer protocol (FTP) servers, application servers, database servers, name servers, print servers and so on.

One of the great benefits of the client-server model is security. The server acts as gatekeeper to all services, data, and resources available to clients. A key element to that security is the ability to establish a secure relationship between the client and server. Once established, the secure relationship allows a free exchange of services and data between the client and server. A corollary to the ability to establish secure relationships is the ability to invalidate. Over time those secure relationships become needless, compromised, or simply stale. Invalidating secure relationships frees up resources on the server to be allocated to other clients.

SUMMARY

One aspect provides a client credentials data structure associated with a client. In one embodiment, the data structure includes: (1) a pre-provisioned set of credentials configured to register the client with a server, (2) a standard user set of credentials employable for secure client-server communication, and (3) a re-acquisition token combinable with the pre-provisioned set of credentials to allow the client to re-register the client with the server.

Another aspect provides a method of restoring secure communication between a registered client and managing server. In one embodiment, the method includes: (1) upon an invalidation of standard user credentials, employing a re-acquisition token created in a previous registration process involving the client and the server and a pre-provisioned set of credentials to re-register the client with the server, and (2) resuming the secure communication.

Yet another aspect provides a secure client-server communication system. In one embodiment, the system includes: (1) a managed client, and (2) a managing server having a memory configured to store a client credentials data structure, including: (2a) a pre-provisioned set of credentials configured to register the client with a server, (2b) a standard user set of credentials employable for secure client-server communication, and (2c) a re-acquisition token combinable with the pre-provisioned set of credentials to allow the client to re-register the client with the server.

BRIEF DESCRIPTION

Reference is now made to the following descriptions taken in conjunction with the accompanying drawings, in which:

FIG. 1 is a block diagram of one embodiment of a secure client-server communication system;

FIG. 2 is a block diagram of one embodiment of a client credentials data structure; and FIG. 3 is a flow diagram of one embodiment of a method of restoring secure communication between a registered client and managing server.

DETAILED DESCRIPTION

Before describing various embodiments of the client credential data structure and method introduced herein, client-server authentication will be generally described.

The foundation of secure client-server communication is a trusted client-server relationship. Accordingly, the server typically needs to establish the identity of the requesting client before rendering any services or allocating resources. Once established, client identity data, or "credentials," tag along with every communication between the client and server. If at any point the server cannot authenticate the client credentials, the communication link fails. This inability to authenticate client credentials is known as the credentials having been invalidated. Many servers notify a client of the invalidation by an "authentication error" message in reply to the failed message.

Upon the invalidation of client credentials, the client must re-establish its identity or trust with the server. It is often the case the trust can only be achieved by a reboot of the client or possibly even a reinstallation of the client. In any case, invalidated client credentials present a critical hurdle to secure communications. Servers are generally reluctant to risk compromising server or client data or even misallocating services or resources without strict authentication of the requesting client. The hurdle is often only overcome by a user providing further authentication data to the server through the client to re-establish the client identity.

It is realized herein that upon an invalidation of client credentials, the client can re-establish its identity with the server and avoid manual user action. It is realized herein client credentials may be invalidated for a variety of reasons, many of which are beyond the client's control. It is further realized herein re-establishing the client's identity can be achieved by employing an improved set of credentials in a re-registration process that can be initiated in an automated fashion. Once complete, secure communications between the client and server may resume.

It is fundamentally realized herein that the improved set of credentials may include a "pre-provisioned" set of credentials to be used for registering the client with the server. It is further realized herein that the improved set of credentials may include a "re-acquisition token," in addition to a standard user set of credentials. It is yet further realized herein that both the re-acquisition token and standard user credentials may be generated during the registration process. In one embodiment, the standard user credentials are communicated along with all secure communications between the client and server. It is still further realized herein that when the standard user credentials are invalidated, the re-acquisition token should come into play, leading to a fundamental realization herein that the client can send the re-acquisition token along with the pre-provisioned credentials to the server for authentication, at which point the server may use the re-acquisition token along with additional private data, known only by the client and server, to authenticate the identity of the client. It is further realized herein that once the client is authenticated, new standard user credentials may be generated and employed in all further secure client-server communication. It is also realized herein that this process essentially constitutes a re-registration, which may itself result in the generation of a new re-acquisition token along with the standard user credentials. It is realized herein that the improved credentials provide an additional layer of security in client-server communication and a more robust communication channel among the server and its clients.

Having generally described client-server authentication, various embodiments of the client credential data structure and method will be described.

FIG. 1 is a block diagram of one embodiment of a client-server communication system 100 having a managing server 102 and a managed client 104, and coupled together by a secure link 106. In alternate embodiments, the communication system may include multiple managing servers and, more often, multiple managed clients. Managing server 102 of FIG. 1 contains a memory 108, a communication protocol 110 and a registration layer 112. The memory 108 contains data structures for storing client credentials 114 and shared client-server data 116.

Likewise, the managed client 104 stores the matching client credentials 114 and the shared client-server data 116. The managed client 104 also has its own communication protocol 118. To establish the secure link 106, the managed client 104 carries out a registration process with the registration layer 112 of the managing server 102. In certain embodiments, the shared client-server data 116 is employed during the registration process. In the system of FIG. 1, the client credentials 114 are generated during the registration process and are stored on both the managed client 104 and the managing server 102. In other embodiments, the client credentials 114 may be stored only on the managed client 104.

Once registered, the managed client 104 and the managing server 102 may carry out secure communication over the secure link 106 via their respective communication protocols 118, 110. The communication protocols 118, 110 rely on the client credentials 114 to maintain the authenticity of the secure link 106. If the client credentials 114 are invalidated, the secure link 106 and the communication protocols 118, 110 fail. The client-server communication system 100 recovers from the failure by re-establishing the identity of the managed client 104 with the managing server 102. This amounts to a re-registration and re-authentication of the client credentials 114, after which secure communication may resume over the secure link 106.

FIG. 2 is a block diagram of one embodiment of the client credentials data structure 114 of FIG. 1. The data structure 114 is configured to store three elements or sets of credentials: pre-provisioned credentials 202, standard user credentials 204 and a re-acquisition token 206. The pre-provisioned credentials 202 are employed during the registration process described for the communication system 100 of FIG. 1. The managed client 104 registers with the managing server 102 using the pre-provisioned credentials 202 to authenticate the identity of the managed client 104. In the embodiment of FIG. 2, the standard user credentials 204 and the re-acquisition token 206 are generated during the registration process. In alternate embodiments, the standard user credentials 204 and the re-acquisition token 206 are not generated during the registration process, but instead during some other process in the communication stream. In certain embodiments, the standard user credentials 204 and the re-acquisition token 206 are static and managed client 104 must simply gain access to those credentials.

Continuing the embodiment of FIG. 2, the standard user credentials 204 are employed during normal operation of the secure link 106 to maintain the authenticity of both the managed client 104 and the managing server 102. In the event the standard user credentials 204 are invalidated, the secure link 106 of FIG. 1 would be disrupted, and the re-acquisition token 206 is employed. The managed client 104 of FIG. 1 sends the re-acquisition token 206 to the managing server 102 to re-establish the managed client's 104 identity. Certain embodiments combine the re-acquisition token 206 with the shared client-server data 116 of FIG. 1 to authenticate the identity of the managed client 104. Other embodiments re-employ the pre-provisioned credentials 202, effecting a re-registration of the managed client 104. Similarly, certain embodiments regenerate the standard user credentials 204 and the re-acquisition token 204 while re-establishing the identity of the managed client 104.

FIG. 3 is a flow diagram of one embodiment of a method of restoring secure communication between a managed client and a managing server. The method begins in a start step 310, assuming a secure client-server link exists between a managed client and a managing server, and that secure link is leveraging a set of standard user credentials to carry out communication between the two. In a step 320, upon an invalidation of the standard user credentials, a re-acquisition token and a set of pre-provisioned credentials previously employed in establishing the secure link are employed to re-register the managed client with the managing server. In certain embodiments, the re-acquisition token and standard user credentials were generated in an initial registration process that established the original secure client-server link. In alternate embodiments the re-registration process regenerates the standard user credentials, and in others, regenerates the re-acquisition token.

Continuing the method of FIG. 3, the re-registration process effectively re-authenticates the managed client and secure communication is resumed in a step 330. The method then ends in an end step 340.

Those skilled in the art to which this application relates will appreciate that other and further additions, deletions, substitutions and modifications may be made to the described embodiments.

What is claimed is:

1. A client credentials data structure associated with a client and comprising:
    a pre-provisioned set of credentials configured to register said client with a server;
    a standard user set of credentials employable for secure client-server communication; and
    a re-acquisition token combinable with said pre-provisioned set of credentials after said standard user set of credentials is invalidated to allow said client to re-register said client with said server, wherein said re-acquisition token is separate and different from both said pre-provisioned set of credentials and said standard user set of credentials.

2. The client credentials data structure as recited in claim 1 wherein said re-acquisition token is configured to be replaced when a new standard user set of credentials is generated.

3. The client credentials data structure as recited in claim 1 wherein said re-acquisition token is configured to be authenticated by data shared by said client and said server.

4. The client credentials data structure as recited in claim 1 wherein said client is managed.

5. The client credentials data structure as recited in claim 1 wherein said client is configured to store a new standard user set of credentials in a memory within said server.

6. The client credentials data structure as recited in claim 1 wherein a new standard user set of credentials are employable to resume said secure client-server communication.

7. A method of restoring secure communication between a registered client and managing server, comprising:
    upon an invalidation of standard user credentials, employing a combination of a re-acquisition token created in a previous registration process involving said client and said server and a pre-provisioned set of credentials to re-register said client with said server, wherein said re-acquisition token is separate and different from both said pre-provisioned set of credentials and said standard user set of credentials; and
    resuming said secure communication.

8. The method as recited in claim 7 wherein said previous registration process generates both said standard user credentials and said re-acquisition token.

9. The method as recited in claim 8 wherein said previous registration process employs said pre-provisioned set of credentials and generates said re-acquisition token.

10. The method as recited in claim 7 further comprising generating replacement standard user credentials.

11. The method as recited in claim 10 wherein said resuming comprises employing said replacement standard user credentials.

12. The method as recited in claim 7 further comprising generating a replacement re-acquisition token.

13. The method as recited in claim 7 wherein said server carries out said employing using data privately shared by said client and said server.

14. A secure client-server communication system, comprising:
    a managed client; and
    a managing server having a memory configured to store a client credentials data structure, comprising:
        a pre-provisioned set of credentials configured to register said managed client with a server,
        a standard user set of credentials employable for secure client-server communication, and
        a re-acquisition token combinable with said pre-provisioned set of credentials after said standard user set of credentials is invalidated to allow said managed client to re-register said client with said server, wherein said re-acquisition token is separate and different from both said pre-provisioned set of credentials and said standard user set of credentials.

15. The secure client-server communication system as recited in claim 14 wherein said re-acquisition token is configured to be replaced when a new standard user set of credentials is generated.

16. The secure client-server communication system as recited in claim 14 wherein said re-acquisition token is configured to be authenticated by data shared by said managed client and said managing server.

17. The secure client-server communication system as recited in claim 14 wherein said managed client is configured to store a new standard user set of credentials in a memory within said managing server.

18. The secure client-server communication system as recited in claim 14 wherein a new standard user set of credentials are employable to resume said secure communication between said managed client and said managing server.

* * * * *